US012292395B2

(12) United States Patent
Thorne et al.

(10) Patent No.: US 12,292,395 B2
(45) Date of Patent: May 6, 2025

(54) SERIAL SYNCHROTRON CRYSTALLOGRAPHY SAMPLE HOLDING SYSTEM

(71) Applicant: MiTeGen, LLC, Ithaca, NY (US)

(72) Inventors: Robert E. Thorne, Ithaca, NY (US); David Closs, Freeville, NY (US); Benjamin Apker, Barton, NY (US)

(73) Assignee: MiTeGen, LLC, Ithaca, NY (US)

( * ) Notice: Subject to any disclaimer, the term of this patent is extended or adjusted under 35 U.S.C. 154(b) by 0 days.

(21) Appl. No.: 18/657,936

(22) Filed: May 8, 2024

(65) Prior Publication Data

US 2024/0319120 A1 Sep. 26, 2024

Related U.S. Application Data

(63) Continuation of application No. 17/435,801, filed as application No. PCT/US2020/021458 on Mar. 6, 2020, now Pat. No. 12,007,342.

(60) Provisional application No. 62/814,510, filed on Mar. 6, 2019.

(51) Int. Cl.
*G01N 23/20033* (2018.01)

(52) U.S. Cl.
CPC .................. *G01N 23/20033* (2013.01); *G01N 2223/1016* (2013.01); *G01N 2223/203* (2013.01); *G01N 2223/602* (2013.01)

(58) Field of Classification Search
CPC ....... G01N 23/20033; G01N 23/20025; G01N 2223/1016; G01N 2223/203; G01N 2223/602; G01N 2223/612
See application file for complete search history.

(56) References Cited

U.S. PATENT DOCUMENTS

| | | | | |
|---|---|---|---|---|
| 6,355,217 | B1 * | 3/2002 | Kiefersauer | G01N 23/20025 422/547 |
| 7,263,162 | B2 | 8/2007 | Thorne et al. | |
| 8,210,057 | B2 | 7/2012 | Thorne et al. | |
| 9,417,166 | B2 | 8/2016 | Thorne et al. | |
| 9,613,780 | B2 | 4/2017 | Konyuba | |
| 9,855,557 | B2 | 1/2018 | Thorne et al. | |
| 10,157,725 | B2 | 12/2018 | Passmore et al. | |
| 10,241,015 | B2 | 3/2019 | Thorne et al. | |
| 11,605,524 | B2 | 3/2023 | Closs et al. | |
| 11,653,644 | B2 | 5/2023 | Thorne et al. | |

(Continued)

FOREIGN PATENT DOCUMENTS

WO 2021067940 A1 4/2021

*Primary Examiner* — Jonathan M Dunlap
(74) *Attorney, Agent, or Firm* — Quinn IP Law

(57) ABSTRACT

A fixed target sample holder for serial synchrotron crystallography comprising goniometer compatible base, a carrier, a sample holding insert which can be placed into the carrier. The sample holing insert comprising fiducials and windows, wherein each of the windows are respectively configured to accept a sample. The windows can also have holes and texture within each window. Additionally, a sample loading workstation for loading crystals into the sample holder and the removal of excess liquid from the sample, comprising a humidity-controlled chamber, a sample support within the chamber, a capture to place the goniometer-compatible base and a channel in communication with the chamber that allows for the flow of humidified air into the chamber.

20 Claims, 8 Drawing Sheets

50
52
54
58
46
56

(56) References Cited

U.S. PATENT DOCUMENTS

2010/0143198 A1 6/2010 Damiano et al.
2012/0261588 A1 10/2012 Wei et al.
2013/0277573 A1 10/2013 Miller et al.
2015/0364294 A1 12/2015 Wei et al.
2016/0189919 A1 6/2016 Passmore et al.
2016/0341675 A1* 11/2016 Doak ............... G01N 23/20008
2021/0066032 A1 3/2021 Kuijper et al.
2022/0146441 A1 5/2022 Thorne et al.
2022/0291098 A1 9/2022 Closs et al.
2022/0412635 A1 12/2022 Closs et al.
2023/0255194 A1 8/2023 Thorne et al.

* cited by examiner 16
24
26
30
28

SERIAL SYNCHROTRON CRYSTALLOGRAPHY SAMPLE HOLDING SYSTEM

CLAIM OF PRIORITY AND CROSS-REFERENCE TO RELATED APPLICATIONS

This application is a continuation of U.S. patent application Ser. No. 17/435,801, which was filed on Sep. 2, 2021, is now allowed, and is a U.S. National-Phase Entry of International Patent App. No. PCT/US2020/021458, which was filed on Mar. 6, 2020, is now lapsed, and claims the benefit of priority to U.S. Provisional Patent App. No. 62/814,510, which was filed on Mar. 6, 2019. All of the foregoing patent applications are incorporated herein by reference in their respective entireties and for all purposes.

BACKGROUND OF THE INVENTION

1. Field of the Invention

The present invention relates to the field of biotechnology. More particularly, the invention pertains to the design of systems for use in delivering crystalline samples for study using X-rays, especially in serial synchrotron crystallography.

2. Description of Related Art

Biomolecular crystallography is a primary tool in molecular biology and biotechnology. The ongoing revolution in molecular biology is supported by our ability to obtain atomic resolution structures of biomolecules and their complexes. These structures provide detailed insight into function, and a starting point for design of a wide range of products that contribute tens of billions of dollars to the U.S. economy.

X-ray crystallography will continue to be the primary tool for studying biomolecular structure. It provides all-atom, atomic resolution information for structures ranging in size from tens to tens of millions of atoms. Once good quality crystals are obtained and a biomolecule's structure has been determined, structures with bound biological or synthetic ligands or of genetically or chemically modified variants can often be readily determined. Unlike cryoelectron microscopy, X-ray crystallography can probe biomolecular structure at room/biological temperature, and so can access biologically relevant conformational ensembles and assess ligand binding when association is weak. It also allows time-resolved studies of conformational changes and product formation, triggered by optical or X-ray excitation, temperature jumps, or by chemical diffusion.

X-ray crystallography is critical in drug discovery and in optimization of enzymes for biotechnology. Once the structure of a drug target is determined, hundreds or thousands of additional structures may be determined using crystals containing drug fragments. To realize the promise of structure-based approaches to drug design, current plans call for throughputs of a thousand structures solved per day per beamline. This compares with roughly two thousand structures determined using all X-ray sources in the entire world in 1998. No other biomolecular structure determination method has the potential to approach this throughput in the next 20 years.

The primary bottleneck in biomolecular crystallography has long been obtaining large, highly ordered crystals. Initial crystallization "hits" tend to yield many small crystals. When these diffract poorly, time-consuming optimization-involving molecular modifications, purification, and adjustment of crystallization conditions—is required. Crystals are damaged by X-rays. At room temperature, data must often be collected from many crystals to assemble a complete data set. To reduce radiation damage, crystals are typically soaked in cryoprotectants and cooled to T=100 K, but these steps introduce additional disorder. These challenges are generally most severe for membrane proteins-which include many important drug targets—and for large biomolecular complexes like the ribosome. Excitement generated by recent advances in cryoelectron microscopy is based in part on cryoelectron microscopy's ability to determine near-atomic resolution structures of large biomolecules and complexes without the need for crystallization. However, structure verification, detailed mechanistic understanding, and drug discovery will continue to require high resolution X-ray crystallography.

Crystals must be identified and harvested from crystallization media, protected from dehydration (for T=300 K measurements) or flash cooled in liquid nitrogen (LN2), transported to an X-ray source, mounted on the beamline's sample stage, and then aligned with the X-ray beam. For crystals larger than ~30-50 micrometers, identification and handling is straightforward, only a small number of (ordered) crystals suffice for structure determination, and methods and hardware for "high throughput" crystallography in use for the last decade are adequate. As crystal size decreases, the number of crystals required for structure determination increases extremely rapidly, and the X-ray data collection time per sample becomes small compared with the time to change samples. Identifying small crystals is difficult, especially when protein aggregates and salt crystals are present or crystals are grown in, e.g., lipidic cubic phase (LCP).

The challenges posed by microcrystals have become more relevant as synchrotron X-ray beam brilliances have grown, beam sizes have shrunk towards 1 micrometer, and fast-framing, essentially noise-free detectors have enabled useful diffraction data to be obtained from ever smaller crystals. For unattenuated microfocused X-ray beams, radiation damage-limited doses at state-of-the-art beamlines are delivered in ~5-10 milliseconds at T=300 K and ~0.2-0.4 s at 100 K; these correspond to maximum data collection times per crystal when crystals are comparable in size to the beam, and can be compared with typical sample changing times of 30-60 s.

Serial synchrotron crystallography increases structure determination throughput. Motivated by advances in sample handling and data analysis for X-ray free-electron laser (XFEL) sources, serial synchrotron X-ray crystallography (SSX) is emerging as one solution to these bottlenecks. In SSX, hundreds or thousands of microcrystals may be "fed" into the X-ray beam in minutes. Microcrystals may be obtained in early crystallization trials before optimization; from small volume crystallization experiments (e.g., using scarce biomolecules); when weak association or slow surface orientation/diffusion kinetics gives slow growth rates; when biomolecules in solution are rapidly degraded; when high initial supersaturations drive high nucleation rates; and when microseeding is used.

"Diffraction before destruction" at XFEL sources limits the useful exposure of each crystal to a single ~100 femtosecond X-ray pulse, which contains as many photons (~1012) as are delivered per second at current microfocus synchrotron beamlines. The crystal's orientation is fixed (and unknown), so most reflections are only partially recorded. Indexing and structure factor determination can require tens of thousands of microcrystals. At synchrotrons, crystals can be rotated during each (ms to s) exposure, reducing reflection partiality and the number of diffraction frames and crystals required. While XFEL exposures generate more diffracted photons per unit volume than is feasible (given radiation damage limits) with synchrotrons, they also do far more damage to crystal regions outside the beam, so their advantage in useful diffraction per unit crystal volume diminishes as lateral crystal size grows beyond the beam size. Combined with limited availability of XFEL beamtime, most serial crystallography data is likely to be collected at synchrotrons. Potential impacts of SSX are not limited to microcrystals. In the many commercial/industrial applications, crystal size is not an issue, and the goal is maximizing throughput and minimizing cost per structure.

SSX sample delivery methods include standard crystallography loops/mounts, thin-film sandwiches, multiple-hole grids or chips, microfluidic chips, high-viscosity injectors, and acoustic deposition and levitation.

Loops/mounts. Microcrystals can be harvested with or pipetted onto nylon loops or microfabricated crystallography mounts. A loop requires liquid to suspend microcrystals within its aperture, generating large background scatter. MiTeGen's MicroMeshes (used at the Swiss Light Source in 2006 for what many consider the first serial microcrystallography experiment) sieve crystals from solution, and excess liquid is removed by blotting the back of the mesh. For flat mounts like meshes, plate and rod-like crystals may lie in preferred orientations, so large oscillations or helical scanning (continuous rotation combined with raster scanning) are needed for full coverage of reciprocal space.

Thin-film sandwiches. Crystals can be grown (or sandwiched) between two optically and X-ray transparent polymer films separated by a gasket. Disadvantages include large background from the crystallization solution/gel (much thicker than most crystals) and the films (which can be replaced with SiN wafers), preferential crystal orientation, and poor cryocooling performance. However, crystal manipulations after growth are eliminated, a major advantage when growth is in, e.g., highly viscous LCP.

Transparent window arrays. Many XFEL experiments have used Si wafers coated with SiN or carbon/PMMA, where the Si is etched away to form an array of thin windows. Crystals are "painted" on the wafers.

Through-hole arrays. Crystals can be contained in an array of through-holes in a substrate. These can be laser-drilled holes in a rigid polymer sheet, and crystals can be grown within them for in situ inspection. Background from crystallization solution is significant, strong scattering from polymer sheet restricts oscillation angles and probing of crystals adjacent to the hole walls, and cryocooling is compromised by the large thermal mass.

Holes can be microfabricated in a thin silicon wafer. Solution containing microcrystals is deposited on top, crystals are drawn into the holes by blotting the back of the wafer, and then X-ray data is collected only from the holes, reducing scanning time. Si produces little diffuse background scatter (although the detector must be protected from the wafer's intense Bragg scatter), and its large thermal conductivity gives good cryocooling performance. A significant fraction of crystals ends up outside the holes—a serious drawback if crystals are not abundant.

Another approach uses a silicon wafer with KOH-etched wells having the form of inverted, truncated pyramids. The top opening width is comparable to the repeat distance, and the bottom opening is slightly smaller than the crystals of interest (typically 5 micrometers). Crystal-containing solution is drawn down through the openings by blotting or, more effectively, by applying suction through a porous platform to the back of the wafer. This approach concentrates crystals in the openings, increasing crystal hit rates and data collection efficiency. A polymer microwell array fabricated by MiTeGen for NSLS-II has similar advantages. Controlling chip loading so that most wells are filled, few crystals are outside the beam path, and few wells contain multiple crystals along the beam path is not trivial, and this may offset the benefits of concentrating crystals.

Microfluidic chips. Examples include a microfluidic trap array that sorts and traps microcrystals at specific positions for X-ray examination, and a microfluidic crystallization array that allows dynamic light scattering and X-ray measurements.

Acoustic drop ejection. Acoustic drop dispensers have been used to project crystals onto MicroMeshes, onto thin X-ray transparent "conveyor belts", and to directly eject crystals from crystallization trays into the X-ray beam. Direct acoustic dispensing onto substrates has promise for, e.g., fragment screening, where microcrystals can be ejected from one solution, and drops from an array of fragment solutions sequentially ejected onto them.

Liquid and gel injectors. Crystals contained in a liquid or a highly viscous medium (e.g., LCP) are formed into a narrow "stream" that flows through the X-ray beam. Injection is popular at XFELs because a single X-ray pulse destroys the crystal, and large crystal flow rates allow efficient use of the ~120 Hz X-ray pulse rate. Crystal slurries flowing through a capillary and LCP gel injectors, both with much smaller flow rates than in XFEL experiments, have been successfully used at synchrotrons. Disadvantages include large background scatter due to the large ratio of stream diameter to crystal size needed to minimize nozzle clogging, the manipulations required to concentrate and then embed crystals in the gel (if they are not grown within it), the difficulty of matching the carrier medium's osmotic environment to that of as-grown crystals, and room-temperature-only data collection.

Each demonstrated approach to SSX sample handling has strengths and weaknesses, and there is no clear winner. Several involve substantial departures from current crystal management workflows, and hardware that is incompatible with the large existing infrastructure for high-throughput crystallography. Inadequate attention has been paid to infrastructure needed to allow home-lab loading and synchrotron delivery of arrays of identically prepared, highly isomorphous crystals.

BRIEF SUMMARY OF THE INVENTION

Embodiments of the present invention solve the above-mentioned downfalls. The serial synchrotron crystallography sample holding system of an embodiment relates to a flexible, integrated, cost-effective system for SSX sample delivery and imaging. This system can integrate to the maximum extent possible with existing infrastructure to speed adoption of SSX methods, while minimizing performance sacrifices relative to purpose-built solutions. Embodiments of the system allow for multiple different sample loading and holding modalities, provides excellent X-ray and optical imaging performance, and allows environmental control to prevent sample dehydration and damage.

BRIEF DESCRIPTION OF THE SEVERAL VIEWS OF THE DRAWING(S)

The present invention will be more fully understood and appreciated by reading the following Detailed Description in conjunction with the accompanying drawings. The accompanying drawings illustrate only typical embodiments of the disclosed subject matter and are therefore not to be considered limiting of its scope, for the disclosed subject matter may admit to other equally effective embodiments. Reference is now made briefly to the accompanying drawings, in which.

DETAILED DESCRIPTION OF THE INVENTION

Figure 1A:
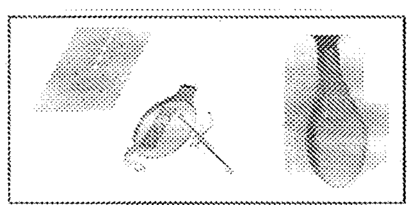
FIGS. 1A through 1G are representations of prior art approaches of serial crystallography.
Figure 1B:
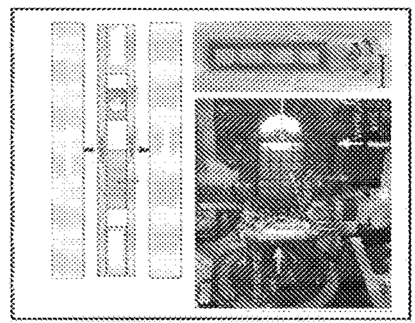
Figure 1C:
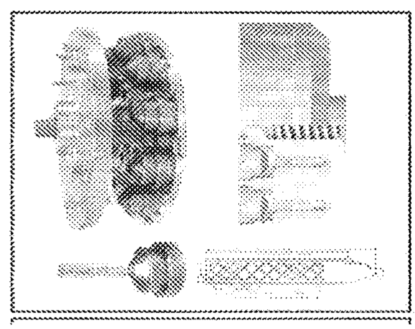
Figure 1D:
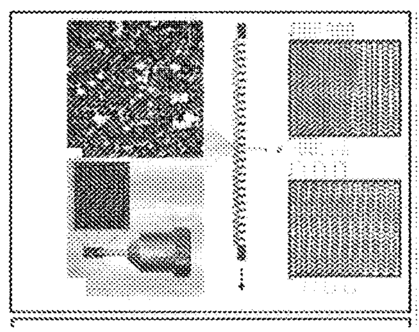
Figure 1E:
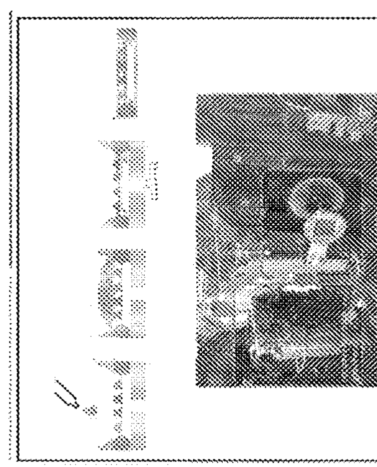
Figure 1F:
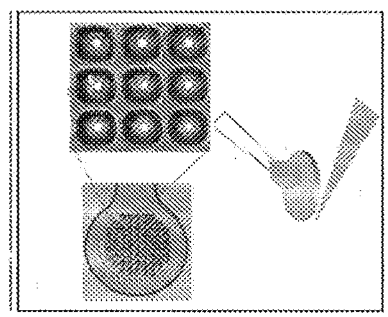
Figure 1G:
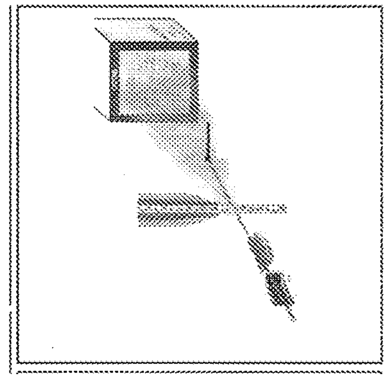

There is shown in FIGS. 1A-1G multiple prior art examples of sample handling approaches for serial crystallography. In FIG. 1A there is shown crystals suspended in liquid within standard crystallography loops. In FIG. 1B there is shown a thin film sandwich containing a crystallization drop, held on a custom stage (for a large cell array) or on a goniometer base using a 3D printed frame. In FIG. 1C there is shown polycarbonate sheet with laser drilled holes for crystallization solution, mounted on goniometer bases and compatible with "pucks" used in high-throughput cryocrystallography. In FIG. 1D there is shown a silicon wafer with an array of holes. In FIG. 1E there is shown A silicon wafer with an array of pyramidal wells with a small hole at their bottom; crystals are sieved into the holes as liquid is drawn through the wafer. A custom stage holds the wafer in the X-ray beam. In FIG. 1F there is shown a polyimide microwell array, with bottom holes for liquid removal and sieving. In FIG. 1G there is shown injection of crystals embedded in a gel or lipidic cubic phase (LCP) into the X-ray beam.

An embodiment of the present invention is directed to a flexible, modular sample handling system for serial synchrotron X-ray crystallography that allows rapid prototyping and testing of design concepts; is maximally compatible with existing infrastructure for high-throughput crystallography; is compatible with both room temperature and T=100 K data collection; allows sample loading in the home lab and shipping to the synchrotron; minimizes X-ray background scatter from all sources; controls the sample environment to maximally preserve crystal isomorphism; and simplifies optical imaging and crystal recognition.

Figures 2A, 2B:
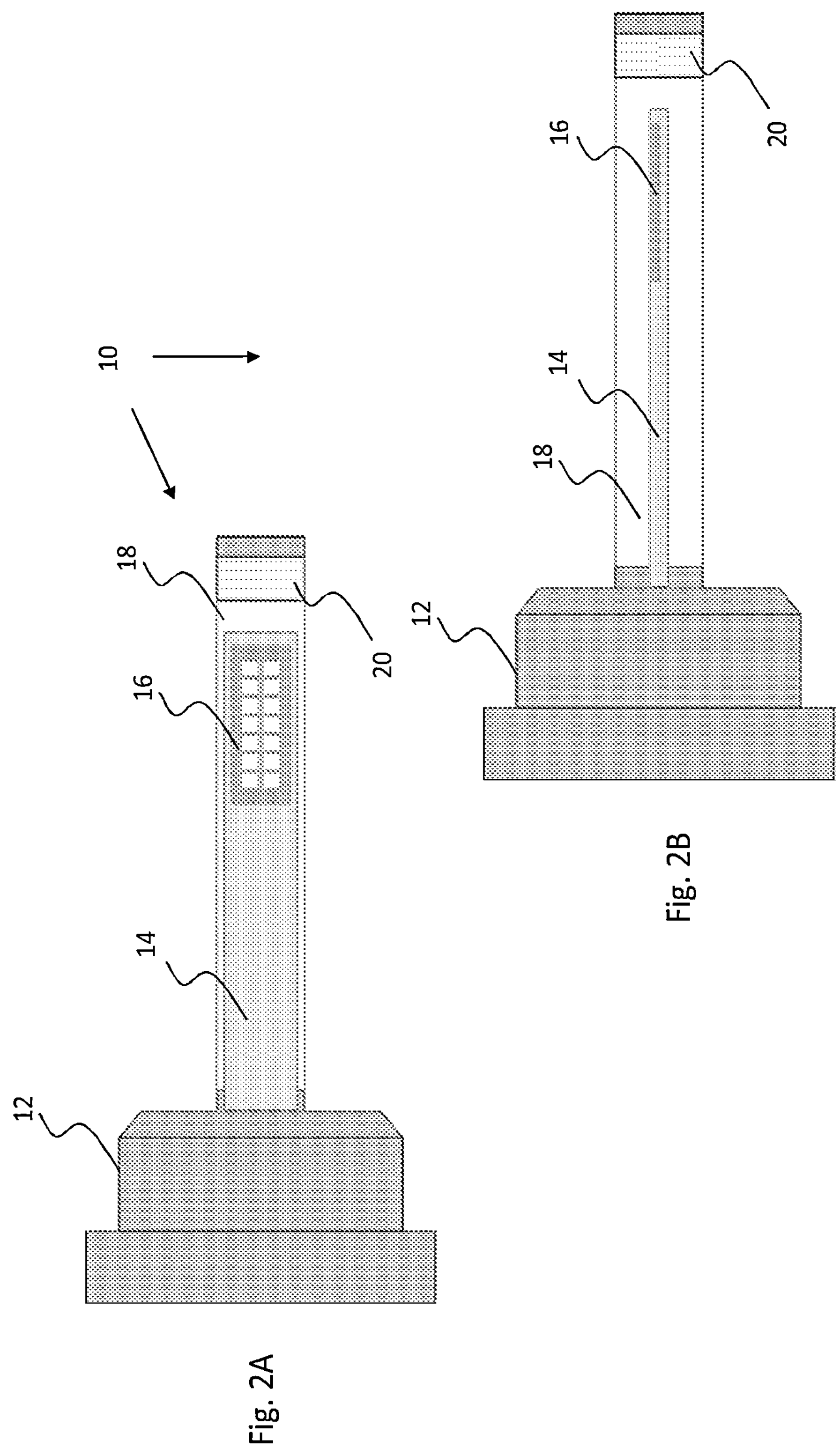
FIGS. 2A and 2B are top and side views, respectively, of an example of the serial crystallography sample holding system.

There is shown in FIGS. 2A and 2B top and side views of a serial crystallography sample holding system referred to generally as reference numeral 10. The sample holding system 10 consists of a goniometer compatible base 12, a carrier 14 attached to the base 12 and centered on its axis, a sample holding insert 16, and a vapor sealing tube 18 that seals to base 12 and that contains an absorbent plug 20 that holds a volume of liquid in place that maintains the humidity of the interior air at a near constant value. As in FIG. 1C, base 12 is based on magnetic steel goniometer bases used for high-throughput crystallography at U.S. and international synchrotron sources.

Figure 3:
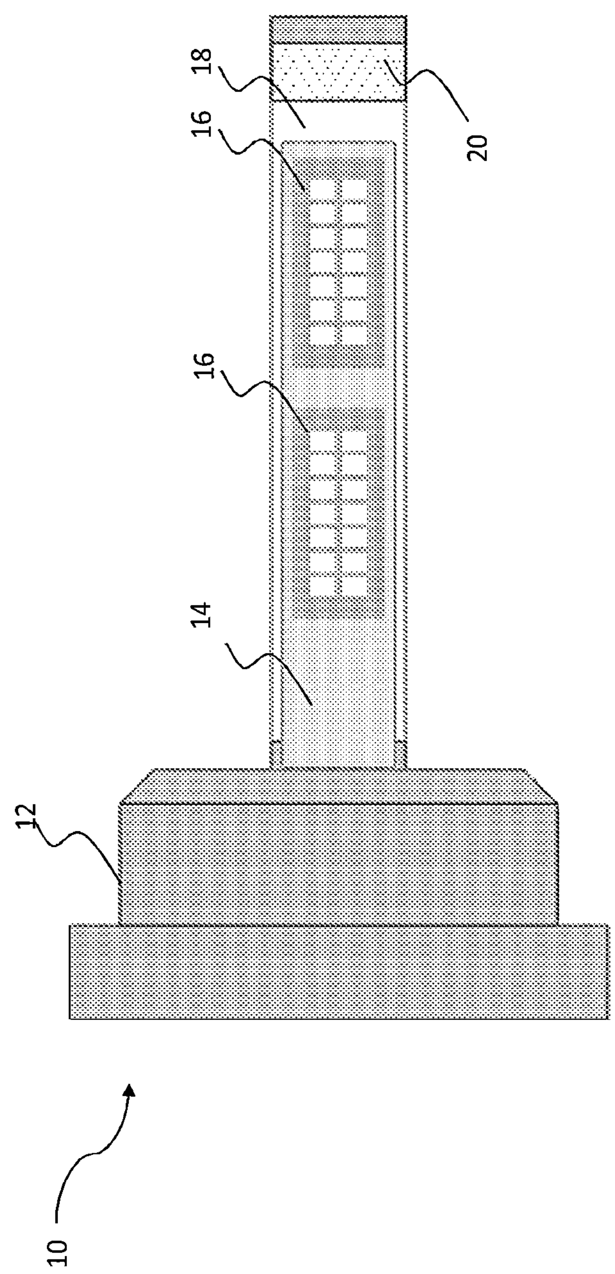
FIG. 3 is a perspective view of an example of the serial crystallography sample holding system.

There is shown in FIG. 3 an alternative version of the serial crystallography sample holding system 10, in this example carrier 14 has two sample holding inserts 16. For T=100 K data collection from samples, sample holding insert 16 dimensions are limited by the diameter of nitrogen gas streams generated by sample cryocoolers to ~5-8 mm. For data collection at 300 K, sample holding insert 16 length can be from ~1 mm up to ~15 mm, or within a few mm of carrier 14 length.

Vapor sealing tube 18 is used to prevent sample dehydration during room temperature storage, shipping and data collection. Vapor sealing tube 18 can be an X-ray transparent tube that covers the sample and carrier 14 and seals to base 12. To offset water vapor transmission through tube walls for several days, an absorbent plug 22 capable of holding ~20-40 microliters of hydrating solution can be used. Vapor sealing tube 18 can be of any suitable material in the art such as but not limited to cyclic olefin copolymer, which has very low water vapor transmission, polyimide, polyethylene terephthalate ("PET"), or glass. For measurements on microcrystals, background scatter from vapor sealing tube 18 that is thick enough to prevent water vapor transmission may be excessive and so vapor sealing tube 18 may need to be removed before data collection. Once vapor sealing tube 18 is removed, the sample humidity can be maintained by sealing the top and bottom surfaces of carrier 14 around its aperture and the sample insert 16 using a very thin film of mylar, PET, aclar, cyclic olefin copolymer ("COC"), or similar polymers, or else it can be placed in a humidified gas stream. Graphene-coated barrier films can allow direct sealing of carrier 14 using a flat, X-ray transparent film without need for the tubing enclosure.

Figures 4A, 4B:
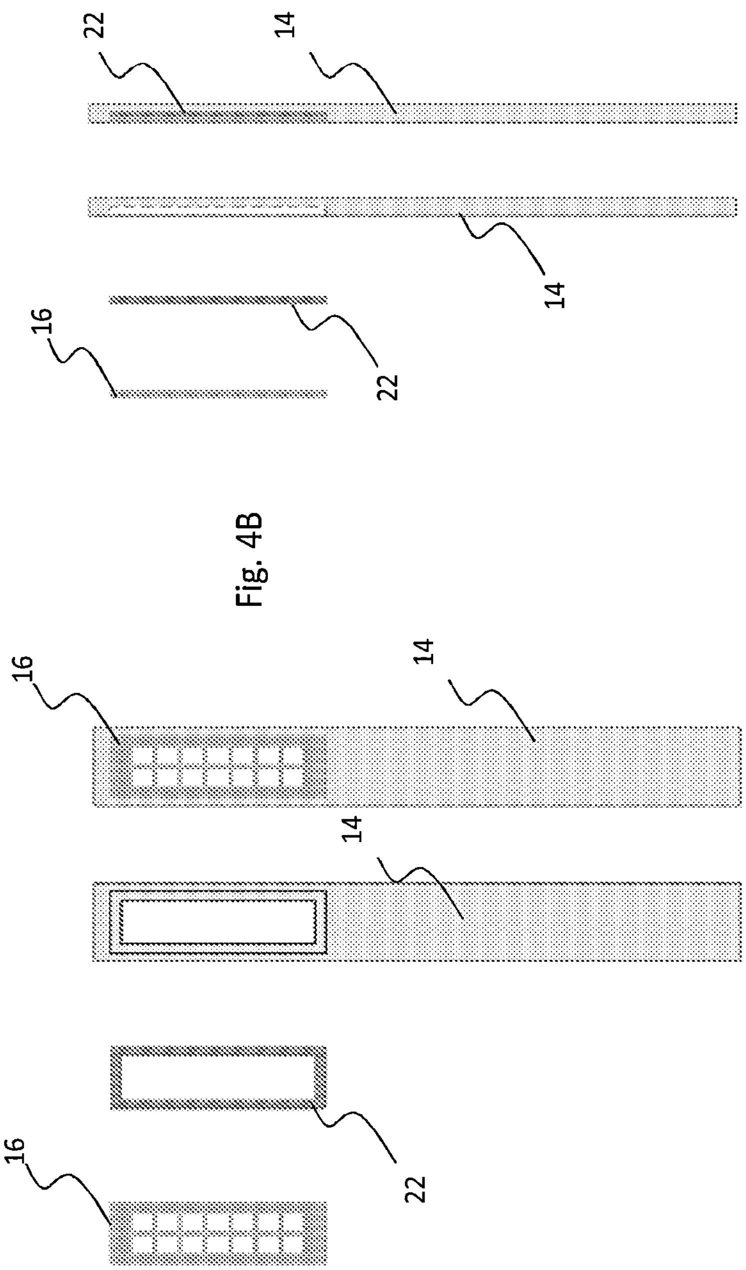
FIGS. 4A and 4B are exploded views of the carrier of the serial crystallography sample holding system.

There is shown in FIGS. 4A and 4B an exploded view of the carrier 14. Carrier 14 has an aperture over which sample holding insert 16 and samples are placed. Carrier 14 can have a recessed region into which the sample holding insert 16 is inserted, or the insert can be directly applied to the top surface of the carrier 14. Since the sample holding insert 16 is thin and flexible, a separate frame 22 can be attached to the sample holding insert 16 in advance to simplify handling. Frame 22 can be fabricated together with sample holding insert 16 (such as by depositing and patterning a thick layer of material such as SU-8 or PDMS around the periphery of the sample holding insert as part of the sample holding insert microfabrication process); or it can be separately fabricated and attached to sample holding insert 16 prior to attachment to the carrier. Carrier 14 can have a recessed rectangular aperture for frame 22 attached to sample holding insert 16. Carrier 14 can have a preferred length of ~18 mm (the current standard in protein crystallography) and a preferred width of 2.5 mm, and the capillary tube diameter is ~3 mm, according to an embodiment. This is because this is the internal space within base grippers of current sample automounting robots. Carrier 14 width and the diameter of the polymer or vapor sealing tube 18 can be increased up to near the diameter of goniometer base 12 (up to ~8 mm). Carrier 14 can be of any stiff, unoriented polymer such as but not limited to COC or polycarbonate. Carrier's 14 thickness can be quite large—50 to 500 micrometers—in the region below the aperture for the sample holding insert 16 to maximize stiffness. If data is to be collected with sample holding insert's 16 plane lying near the plane of the incident X-ray beam, then the thickness of carrier 14 in region of the insert aperture should be reduced to 25-200 micrometers to reduce obstruction of incident and diffracted X-rays when carrier 14 plane is rotated near that of the beam. Unoriented polymers are preferred in an embodiment of carrier 14 because they give only weak and diffuse background scatter. Metals, ceramics, and silicon can also be used, but in that case provision may preferably need to be made during X-ray data collection to either prevent the X-ray beam from striking the carrier or else to prevent X-rays scattered from the carrier from damaging the X-ray detector.

Frame 22, as shown in FIGS. 4A and 4B, can be fabricated at the same time as sample holding insert 16 via a multilayer lithographic patterning process or can be separately fabricated and attached to sample holding inserts 16 using thermal or ultrasonic bonding, an adhesive gasket, or glue. Frames 22 need not be directly attached to sample holding inserts 16, but can simply be placed on top of them in carrier 14, and then held in place on carrier 14 using glue applied to the top or outside of frame 22 and carrier 14, or using an adhesive backed film placed over frame 22 and carrier 14. When a frame is not used, the sample holding insert can be directly attached to the carrier using glue, an adhesive-backed thin film gasket, or by ultrasonic welding.

Conservatively assuming a maximum microcrystal density of ~400/mm$^2$ (50 micrometer spacing), each carrier 14 can then hold from ~5,000 (for 100 K data collection) to 12,000 crystals; actual crystal densities will depend on how crystals are produced and concentrated. With data collection times per crystal of ~40 ms, total collection times of at least 3 minutes for a 2×6 mm active area will be larger than sample holder exchange and orientation times, so there is little benefit to much larger area inserts.

Figures 5A, 5B, 5C, 5D:
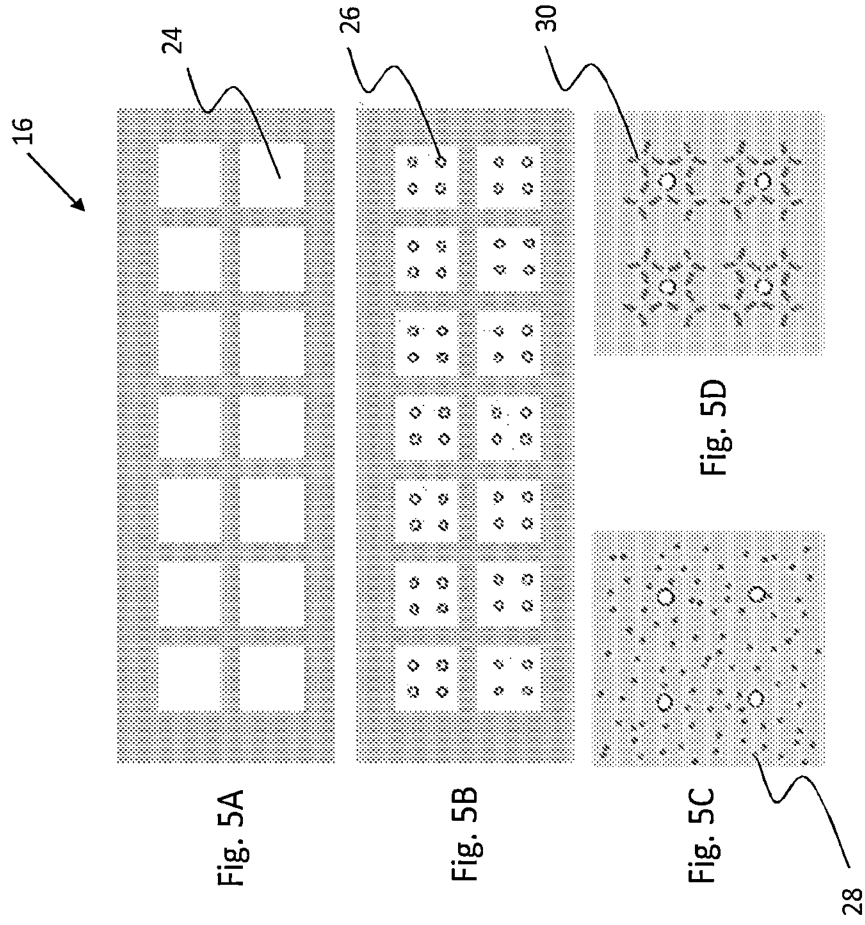
FIGS. 5A through 5D are perspective views of examples of sample holding inserts of the serial crystallography sample holding system.

There is shown in FIGS. 5A-5B examples of sample holding insert 16. All include fiducials (not shown)—made of holes in the film, lines and markings make by having thicker film regions or extra layers with different colors to maximize optical contrast—for defining the insert's coordinate system for optical and X-ray scanning. In FIG. 5A there is shown sample holding insert 16 having thin continuous windows 24, with thicker "ribbing" to prevent handling damage and deformation. This example consists of a thin (10-25 micrometer) sheet of X-ray transparent polymer with arrays of ~0.5-3 micrometer thick, continuous windows 24. In FIG. 5B there is shown thin windows having holes 26 through which excess liquid can be drawn, sized so that the crystals of interest are too large to pass through. Windows with drain holes 26 can be used for removing excess solvent, or "mesh" windows with dense hole arrays can be used. Continuous windows give clean crystal imaging and are ideal when crystals are dispensed in tiny ultrasonically-generated drops. When crystal-containing drops are manually deposited, holes 26 allow excess liquid to be removed and crystals to be concentrated on the surface. Holes 26 should be somewhat smaller than the crystal size of interest, but not so small as to inhibit liquid flow excessively; 1-20 micrometers is a good size range. When excess liquid is removed through holes 26 in a sample support, microcrystals stream toward each hole and accumulate there, so that crystals and/or their diffraction patterns overlap.

The windows can be textured by, for example, adding a random array of cylindrical posts 28 to inhibit crystal streaming toward the holes, or adding arrays of short curved walls 30 that form traps for crystals as they stream toward the holes. These posts and walls can impede microcrystal motion by physically blocking their path (when the posts and walls are taller than the crystals, and where the crystals have sedimented to near the window surface), and also be thinning the excess liquid above them, which increases viscous drag and slows both liquid and crystal flow in their vicinity. In FIG. 5C there is shown the surface of the sample-supporting films having arrays of posts or protrusions 28 that create surface topography that tends to stop and trap crystals against or near them, particularly when crystals might otherwise be carried along by liquid flows during liquid removal through holes 26. In FIG. 5D there is shown holes 26 being surrounded by arrays of short walls that form crystal traps, that preferentially position the crystals at certain locations when liquid is drawn out through holes 26. The height of these features may be less than the crystal thickness-perhaps 2-5 micrometers—to minimize their optical contrast. Crystals can also be trapped in an array of vertical wells with bottom holes.

Sample holding insert 16 can be made of any suitable material in the art such as but not limited to polyimide or silicon. Polyimide can be limiting in some circumstances for example, as crystal thicknesses drop below 2 micrometers, background scatter from minimum polyimide layer thicknesses of ~2 micrometers may become significant. Polyimide damage by intense microfocused beams may become problematic. In these cases, the cost of silicon may be justified. Sample holding insert 16 designs can be similar to those in FIGS. 5, where windows are formed of SiN. The all-silicon well-mounts based on the design in FIG. 1F can also be used.

Figures 6A, 6B:
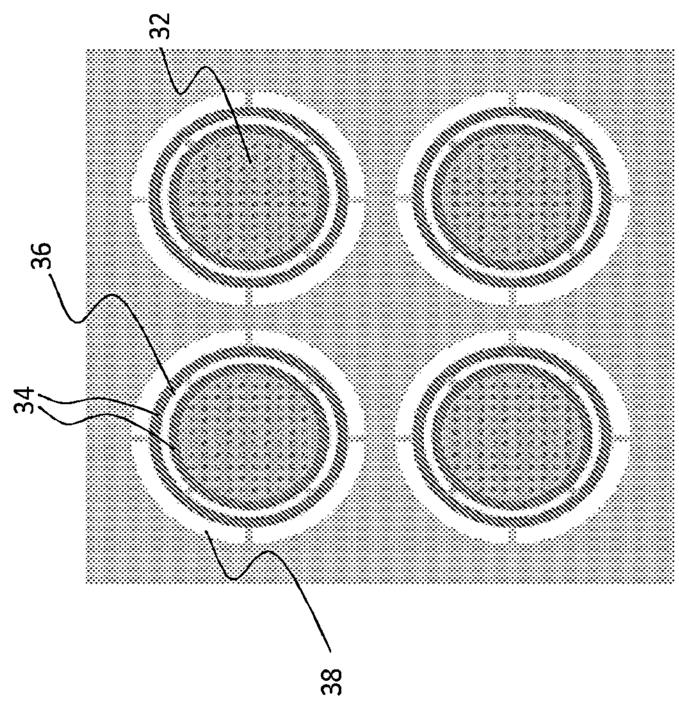
FIGS. 6A and 6B are top and side views, respectively, of an alternative example of the sample holding insert of the serial crystallography sample holding system.

There is shown in FIG. 6A and FIG. 6B top and side views of an alternative sample holder insert design for holding crystals in liquid drops that may have different compositions and that need to be isolated and prevented from mixing. This example of sample holding insert 16 is suitable for serial crystallography on microcrystals, where large numbers of crystals are required. FIGS. 6A and 6B show a cell of a sample holding insert 16 for, e.g., high-throughput fragment screening. Here, crystals can be larger, and fewer required for each structure, and the goal is to maximize the number of crystals containing different fragments that can be delivered into the X-ray beam per hour. The design, as shown in FIGS. 6A and 6B, has of an array of isolated "pads" 32, onto which drops containing crystals soaked in different ligands are deposited. Pads are a region of the sample holding insert that holds one drop and is isolated from the rest of the film by a gap in the film 38. Each pad has a thin part where the crystal containing drop is deposited. It also has thicker rings that help confine the liquid to the pad and keep it from spreading. The central region of each pad consists of an X-ray transparent window with holes and other features as in FIG. 5B-D. Surrounding this are two concentric and much thicker (~5-25 micrometer) rings 34, separated by gap 36. The inner ring pins the contact line of each drop and holds it in place until liquid is withdrawn through the window's holes, allowing the liquid volume (and number of crystals) deposited to be maximized. The gap 36 and outer, guard ring prevent liquid spreading to an adjacent pad. An additional gap 38 separates this outer guard ring from the rest of the insert, and provides an additional obstacle to liquid spreading.

Figure 7A:
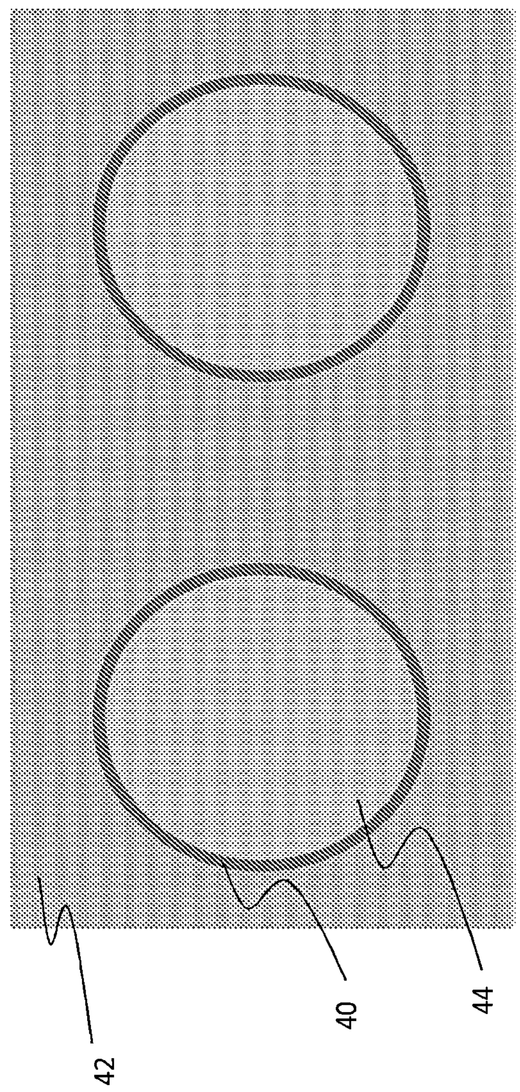
FIGS. 7A and 7B are top and side views, respectively, of an alternative example of the sample holding insert of the serial crystallography sample holding system.
Figure 7B:
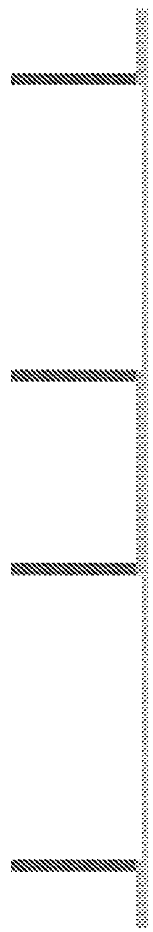

There is shown in FIGS. 7A and 7B top and side views of an alternative sample holder insert design that allows in situ crystal growth. The ~200 (50-500) micrometer tall, ~500 (200-750) micrometer diameter cylinders 40 with ~40 (10-100) micrometer wall thicknesses contain the crystallization solution, and are supported on a ~25 (10-50) micrometer layer 42 with thin (0.5-5 micrometer) windows 44 and possibly also small drain holes beneath each cylinder. These inserts are covered with vapor sealing tube 18 (as in FIGS. 2 and 3) with the absorbent plug 20 saturated with reservoir solution. The vapor sealing tube is advantageous for room temperature data collection and crystal growth. The vapor sealing tube can also be accomplished by alternative ways to keep the drops from drying out. Samples can also be immediately frozen after deposition, in liquid nitrogen, in which case no sealing tube is necessary. Thin wall cylinders allow fast cooling and reduce absorption of diffraction from crystals located near the walls. High aspect ratio features can be microfabricated using SUEX, a photoexposable polymer available in sheet form.

Membrane protein crystallization is often performed using LCP "sandwiches". As in FIG. 1(B) lower right, individual cells can be cut out and attached to a goniometer base. Current LCP plates have 9×9 mm cells with ~6 mm diameter areas for LCP, and so can be accommodated on standard goniometer bases but are too wide for most sample automounter grippers. We will explore the feasibility and market interest in moving to smaller cell sizes, to allow automated handling and more cells on each sample holder.

These sample holding inserts 16 can be microfabricated from X-ray transparent, radiation hard polyimide using a proprietary stepped multi-thickness approach. Frames 22 can be microfabricated directly onto the inserts from SU-8 or similar material, or they can be laser cut from COC or polycarbonate sheet.

Transferring crystals and solution from crystallization plates to SSX sample holders can be difficult. Crystallography loops and mounts are too flexible for some harvesting tasks, and achieving wetting of and transfer to the holder can be difficult. Materials including SUEX and metals can be microfabricated to form tool tips, and may have advantages in maximum possible thickness, rigidity, surface wetting, and durability. Loops can be replaced with small cylinders having serrated ends, which can hold more liquid and crystals and destabilize the liquid contact line. The windows to which crystals are transferred can have one or more small diameter, 10-25 micrometer tall posts that "puncture" the liquid meniscus to induce transfer. Selective area surface treatments to improve wetting properties of both tools and sample inserts may also be feasible.

Figure 8B:
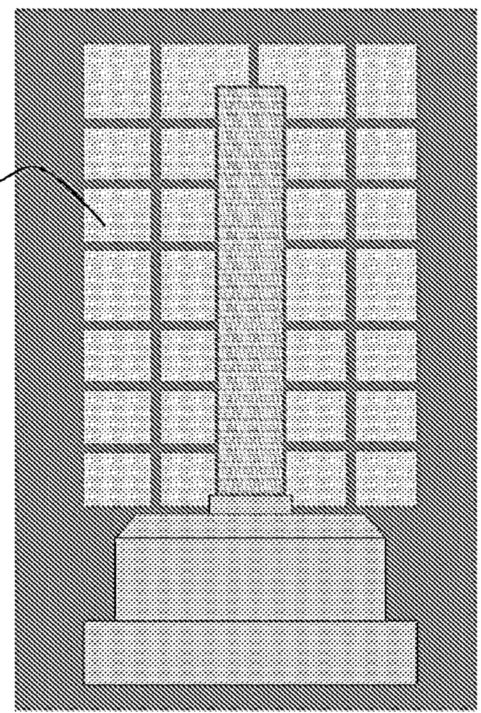
FIGS. 8A and 8B are top and side views of a sample loading workstation.
Figure 8A:
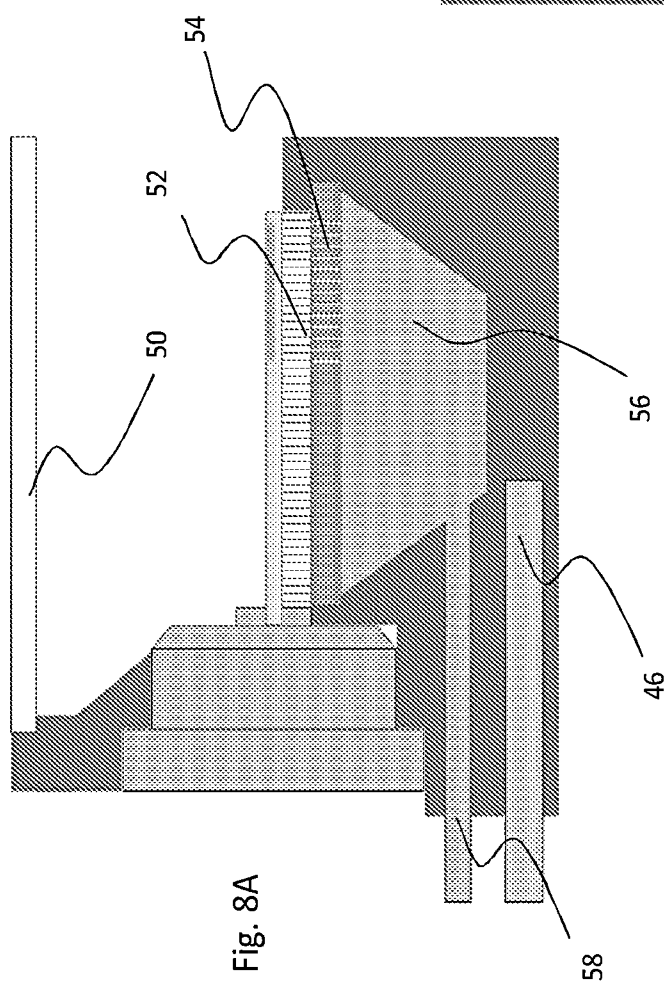

There is shown in FIGS. 8A and 8B a sample loading workstation for loading crystals into the sample holder that allows excess liquid to be sucked off the sample holder and that maintains the sample holder in a humid atmosphere to prevent sample dehydration. The workstation allows concentration by removing excess liquid through holes in sample holding insert 16, or by blotting the sample holding side away from the sample support windows. To prevent crystal dehydration and nonisomorphism due to uneven liquid removal, loading and liquid removal must be done in a humidified environment, ideally at a relative humidity that matches the crystal's water activity, which is typically 97% r.h. and above. Humidified air flows into the workstation through channel 46 and upwards through vent holes 48 on either side of sample carrier 14 into the chamber above the sample. The chamber can have a clear cover and sides of plastic or glass 50 for optical inspection. The sample carrier 14 rests over a plate with a hole array 54 over a chamber 56 connected via a channel 58 to a suction device. Suction applied to the back of the sample holder can then suck liquid through the holes in the sample holding inserts. Suction can be provided, for example, by a mechanical pump or a venturi-type compressed air vacuum generator. The amount of suction can be controlled using, for example, a foot-pedal valve. In a preferred implementation, a piece of die cut filter paper or absorbent material 52 can be inserted on top of the plate with the hole array, so that suction is applied through the filter paper. The combination of capillary action by the absorbent material and suction allows gentle and efficient liquid removal for viscous and non-viscous liquids. Suction combined with vertically-oriented filter fibers can reduce lateral spreading of liquid, minimizing cross-contamination between different regions of the sample insert (relevant if these regions contain crystals soaked in, e.g., different solutions containing, e.g., different ligands as for the insert in FIG. 6.) The workstation can incorporate a holder (e.g., a channel in the same surface that holds the die-cut filter paper strip, parallel to the strip) for the polymer tube and a mechanism for translating the sample holder into position (e.g., laterally so that it then resides in the same channel as the tube) so that the tube 18 can be translated onto the goniometer base 12 within the humidified environment (holder not shown). The sample loading station may also incorporate a solid support onto which die cut filter paper may be placed. The sample holder can then be translated so that the sample holding insert contacts the filter paper, to allow liquid removal without suction. The sample loading station may also incorporate one or more solid supports onto which thin X-ray transparent sealing films may be placed. The sample holder may then be translated and the region of the carrier surrounding the sample support films pushed down onto the sealing films so as to seal the samples and prevent dehydration during X-ray measurements.

It should be understood that the values used above are only representative values, and other values may be in keeping with the spirit and intention of this disclosure.

While several inventive embodiments have been described and illustrated herein with reference to certain exemplary embodiments, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein (and it will be understood by one skilled in the art that various changes in detail may be effected therein without departing from the spirit and scope of the invention as defined by claims that can be supported by the written description and drawings). More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto; inventive embodiments may be practiced otherwise than as specifically described and claimed. Further, where exemplary embodiments are described with reference to a certain number of elements it will be understood that the exemplary embodiments can be practiced utilizing either less than or more than the certain number of elements.

All references, including publications, patent applications, and patents, cited herein are hereby incorporated by reference to the same extent as if each reference were individually and specifically indicated to be incorporated by reference and were set forth in its entirety herein.

All definitions, as defined and used herein, should be understood to control over dictionary definitions, definitions in documents incorporated by reference, and/or ordinary meanings of the defined terms.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if not directly attached to where there is something intervening.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

The recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not impose a limitation on the scope of the invention unless otherwise claimed.

No language in the specification should be construed as indicating any non-claimed element as essential to the practice of the invention.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

It will be apparent to those skilled in the art that various modifications and variations can be made to the present invention without departing from the spirit and scope of the invention. There is no intention to limit the invention to the specific form or forms disclosed, but on the contrary, the intention is to cover all modifications, alternative constructions, and equivalents falling within the spirit and scope of the invention, as defined in the appended claims. Thus, it is intended that the present invention cover the modifications and variations of this invention provided they come within the scope of the appended claims and their equivalents.

What is claimed is:

1. A sample loading system, comprising:

a sample holder including a sample holder base and a sample carrier attached to the sample holder base, the sample carrier including a sample support region configured to support thereon a sample in a liquid, the sample support region having opposing top and bottom surfaces with a through-hole extending from the top surface to the bottom surface; and a sample loading workstation including a humidity-controlled enclosure containing:

a humidified chamber configured to receive humidified air, the enclosure including an opening providing access to an interior of the humidified chamber;

a vacuum chamber in fluid communication with the humidified chamber and located adjacent the sample carrier; and a sample holder platform adjacent the humidified chamber and including a capture device receiving the sample holder base such that the sample carrier is positioned within the humidified chamber adjacent the vacuum chamber, wherein the vacuum chamber is configured to selectively apply suction to the sample carrier of the sample holder to thereby remove the liquid from the sample.

2. The sample loading system of claim 1, wherein the vacuum chamber is connected via a channel to a port configured to mate with a suction device.

3. The sample loading system of claim 2, wherein the suction device is a vacuum pump or a compressed air vacuum generator.

4. The sample loading system of claim 2, wherein the suction device is configured to continuously vary the suction applied to the sample carrier via the vacuum chamber.

5. The sample loading system of claim 4, wherein the suction device includes a foot-pedal controlled valve configured to control the suction applied by the suction device.

6. The sample loading system of claim 1, wherein the sample holder platform defines a channel in fluid communication with the humidified chamber and configured to feed thereto the humidified air.

7. The sample loading system of claim 6, wherein the sample holder platform further defines an array of vent holes fluidly connected to the channel and configured to disperse the humidified air into the humidified chamber.

8. The sample loading system of claim 1, further comprising a filter paper attached to the sample holder platform and contacting the sample holder to thereby absorb a portion of the liquid from the sample carrier.

9. The sample loading system of claim 8, wherein the filter paper is pressed against the bottom surface of the sample carrier and interposed between the sample holder and the vacuum chamber thereby allowing the suction applied through the vacuum chamber to remove the liquid from the sample carrier.

10. The sample loading system of claim 1, wherein the humidified chamber maintains a humidity above about 97%.

11. The sample loading system of claim 1, wherein the humidified air enters the humidified chamber through a series of vent openings in the sample holder platform and located beneath the sample holder.

12. The sample loading system of claim 1, further comprising a solid support attached to a top surface of the sample holder platform and configured to accept a sample holder sealing film such that the sample holder may be pressed against the sealing film to thereby seal the sample holder.

13. The sample loading system of claim 1, wherein the sample loading workstation further includes an optically clear window attached to the sample holder platform and extending across the humidification chamber.

14. The sample loading system of claim 1, wherein the sample loading workstation further includes a sample holder plate attached to the sample holder platform and interposed between the sample carrier and the vacuum chamber, the sample holder plate including an array of through-holes allowing the suction applied through the vacuum chamber to remove the liquid from the sample carrier.

15. The sample loading system of claim 14, wherein the sample holder plate extends across and covers the vacuum chamber.

16. The sample loading system of claim 15, further comprising a fluid-absorbent filter paper sandwiched between and pressed against the sample carrier and the sample holder plate.

17. A sample loading workstation for loading a sample onto a sample holder, the sample holder including a base and a sample carrier attached to the base, the sample carrier configured to support thereon the sample in a liquid, the sample loading workstation comprising:

a humidified chamber configured to receive humidified air and having an opening to access an interior of the humidified chamber;

a vacuum chamber in fluid communication with the humidified chamber and located adjacent the sample carrier; and a sample holder platform adjacent the humidified chamber and including a capture device configured to receive the sample holder base such that the sample carrier is positioned within the humidified chamber adjacent the vacuum chamber, wherein the vacuum chamber is configured to selectively apply suction to the sample carrier of the sample holder to thereby remove the liquid from the sample.

18. The workstation of claim 17, wherein the vacuum chamber is connected via a channel to a port configured to mate with a suction device.

19. The workstation of claim 17, further comprising a filter paper attached to the sample holder platform and contacting the sample holder to thereby absorb a portion of the liquid from the sample carrier.

20. The workstation of claim 17, further comprising a sample holder plate attached to the sample holder platform and interposed between the sample carrier and the vacuum chamber, the sample holder plate including an array of through-holes allowing the suction applied through the vacuum chamber to remove the liquid from the sample carrier.

* * * * *